(12) United States Patent
Lunt et al.

(10) Patent No.: US 8,825,757 B2
(45) Date of Patent: *Sep. 2, 2014

(54) UNIFIED COLLECTION AND DISTRIBUTION OF DATA

(71) Applicant: Brighttag Inc., Chicago, IL (US)

(72) Inventors: Eric M. Lunt, Barrington, IL (US);
Blane E. Sims, Chicago, IL (US); Marc E. Kiven, Buffalo Grove, IL (US);
Michael D. Sands, Chicago, IL (US);
Todd L. Chu, New York, NY (US)

(73) Assignee: Signal Digital, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,210

(22) Filed: Aug. 26, 2013

(65) Prior Publication Data

US 2013/0346488 A1    Dec. 26, 2013

Related U.S. Application Data

(63) Continuation of application No. 13/161,408, filed on Jun. 15, 2011, now Pat. No. 8,560,610.

(60) Provisional application No. 61/355,519, filed on Jun. 16, 2010, provisional application No. 61/355,532, filed on Jun. 16, 2010, provisional application No. 61/377,753, filed on Aug. 27, 2010.

(51) Int. Cl.
G06F 15/16 (2006.01)
H04L 29/08 (2006.01)

(52) U.S. Cl.
CPC ............... *H04L 67/02* (2013.01); *H04L 67/30* (2013.01)
USPC ........................... 709/203; 709/204; 709/205

(58) Field of Classification Search
CPC .. H04L 67/02; H04L 67/2814; G06F 17/3087
USPC .......................................... 709/203, 204, 205
See application file for complete search history.

(56) References Cited

U.S. PATENT DOCUMENTS

2002/0019853 A1* 2/2002 Vange et al. ................... 709/207
2010/0138485 A1* 6/2010 Chow et al. ................... 709/203

* cited by examiner

*Primary Examiner* — Adnan Mirza
(74) *Attorney, Agent, or Firm* — Squire Patton Boggs (US) LLP

(57) ABSTRACT

A stub tag in source code of a webpage allows for collection of numerous data elements according to tracking tags of various data receiver parties and for distribution of the collected data elements to those parties. The stub tag references a remotely cached script that enables a user device, e.g. a computer running a web browser, to retrieve a tag code for collecting the data elements. The tag code is constructed according to data collection settings, data distribution settings, data receiver settings, and/or user privacy settings. The tag code results in a single variable, common to all data receiver parties, for each data element. The common variable is transmitted to data receivers through the user device or through a server-to-server API.

20 Claims, 14 Drawing Sheets

---

STUB TAG EXAMPLE 1

```
<script type="text/javascript" src="//hostname.com/tag.js">
    _tracked_site="ab123";
</script>
```

STUB TAG EXAMPLE 2

```
<script src="//s.btstatic.com/tag.js">
    { site: "xAzftcN" }
</script>
```

STUB TAG EXAMPLE 3

```
<script src="//s.btstatic.com/tag.js">
{
    site: '382hdu9'
}
</script>
<noscript>
<iframe src="//s.btstatic.com/iframe?c=382hdu9" width="1"
height="1" frameborder="0" scrolling="no" marginheight="0"
marginwidth="0"></iframe>
</noscript>
```

URL Query String Parameters
*Example:* `http://www.anywebsite.com/content.html?color=blue&size=sm`
The above URL specifies two query string parameters – *"color,"* which has a value of *"blue,"* and *"size,"* which has a value of *"sm."*

HTML Meta Tag Values
*Example:*
`<meta name="zipcode" content="10124" />`
The above defines a metadata element called *"zipcode,"* which has an assigned value of *"10124."*

JavaScript Variables
*Example:*
```
<script type="text/javascript">
    var location;
    location = navigator.geolocation.getCurrentPosition();
</script>
```
The above defines a JavaScript variable called *"location,"* which obtains the current latitude and longitude coordinates of the user from a call to the *"navigator.geolocation"* API.

Unstructured Content
*Example:*
```
<div class="shopping_cart_item">
    <tr>
    <td>1</td>
    <td>1234567</td>
    <td>Winter Coat</td>
    <td>Blue</td>
    <td>Small</td>
    <td>$169.99</td>
    <td>$169.99</td>
    </tr>
</div>
```
The above HTML code renders a table row that contains the quantity, SKU, description, color, size, unit price and total price for a single line item of a shopping cart.

FIG. 1 (prior art)

STUB TAG EXAMPLE 1

```
<script type="text/javascript" src="//hostname.com/tag.js">
    _tracked_site="ab123";
</script>
```

STUB TAG EXAMPLE 2

```
<script src="//s.btstatic.com/tag.js">
    { site: "xAzftcN" }
</script>
```

STUB TAG EXAMPLE 3

```
<script src="//s.btstatic.com/tag.js">
{
    site: '382hdu9'
}
</script>
<noscript>
<iframe src="//s.btstatic.com/iframe?c=382hdu9" width="1"
height="1" frameborder="0" scrolling="no" marginheight="0"
marginwidth="0"></iframe>
</noscript>
```

| Website A (site id: abc123) | | |
|---|---|---|
| Webpage A1 | Webpage A2 | Webpage A3 |
| Data Element A1; DBE | Data Element A1; DBE | Data Element A1; DBE |
| Data Element A2; DBE | Data Element A2; DBE | Data Element A4; DBE |
| Data Element A3; DBE | Data Element A3; DBE | Data Element A5; DBE |

| Website B (site id: xAzftcN) | | |
|---|---|---|
| Webpage B1 | Webpage B2 | Webpage B3 |
| Data Element B1; DBE | Data Element B1; DBE | Data Element B4; DBE |
| Data Element B2; DBE | | Data Element B5; DBE |
| Data Element B3; DBE | | Data Element B6; DBE |

| Website C (site id: 382hdu9) | | |
|---|---|---|
| Webpage C1 | Webpage C2 | Webpage C3 |
| Data Element C1; DBE | Data Element C1; DBE | Data Element C2; DBE |
| | | Data Element C3; DBE |
| | | Data Element C4; DBE |

| Website A | | |
|---|---|---|
| Data Receiver 1 | Data Receiver 2 | Data Receiver 3 |
| Data Element A1; DEF | Data Element A1; DEF | Data Element A1; DEF |
| | Data Element A5; DEF | Data Element A2; DEF |
| | | Data Element A3; DEF |

| Website B | | |
|---|---|---|
| Data Receiver 1 | Data Receiver 4 | Data Receiver 5 |
| Data Element B1; DEF | Data Element B1; DEF | Data Element B1; DEF |
| Data Element B5; DEF | | Data Element B2; DEF |
| Data Element B6; DEF | | Data Element B3; DEF |

| Website C | | |
|---|---|---|
| Data Receiver 2 | Data Receiver 3 | Data Receiver 6 |
| Data Element C1; DEF | Data Element C1; DEF | Data Element C1; DEF |
| Data Element C2; DEF | Data Element C2; DEF | |
| Data Element C3; DEF | | |

EXAMPLE OF SCRIPT CODE IN TAG.JS

```
BrightTag.ServerURL = function(config) {
  var host = config.host,
    parentReferrer = config.parentReferrer,
    referrer = config.referrer;

var scheme = host.match('^[a-z0-9+.-]+://.+') ? "" :
"//";

var self = this;
  BrightTag.HTTP.URL.call(this, scheme + host + "/tag");

self.appendParam("site", config.site)
      .appendParam("referrer", referrer)
      .appendParam("mode", config.mode);

if (referrer !== parentReferrer) {
    self.appendParam("parentReferrer", parentReferrer);
  }
};
```

FIG. 9

EXAMPLE OF STUB TAG REQUEST

```
HTTP GET
Location: http://tagserve.stage.thebrighttag.com/tag?site=xAzftcN
    &referrer=http%3A%2F%2Fwww.sample.com%2F
Host:      tagserve.stage.thebrighttag.com
User-Agent: Mozilla/5.0 (Macintosh; Intel Mac OS X 10.6; rv:2.0.1)
    Gecko/20100101 Firefox/4.0.1
Accept: */*
Accept-Language: en-us,en;q=0.5
Accept-Encoding: gzip, deflat
Accept-Charset: ISO-8859-1,utf-8;q=0.7,*;q=0.7
```

FIG. 10

EXAMPLE OF CODE FOR INFERENCE ALGORITHM

```
(function() {
  var getParentReferrer = function() {
    if (top == self) {
      return self.parent.location.href;
    } else {
      return self.window.location.href
    }
  };

var config = {
    "test": false,
    "document": document,
    "host": "s.thebrighttag.com",
    "referrer": window.location.href,
    "parentReferrer": getParentReferrer(),
    "data": {}
  };
```

FIG. 11

EXAMPLE OF BROWSER-DIRECT DISTRIBUTION TAG

```
document.write('\x3cimg src\x3d\x22http://r.casalemedia.com/j.gif
?u\x3d152239\x26s\x3d1\x26src\x3d'+bt_data('source')+'\x26kw\x3d'
+bt_data('seo keywords')+'\x26sample\x3d'+bt_data('test group')
+'\x22 width\x3d\x221\x22 height\x3d\x221\x22
alt\x3d\x22\x22/\x3e');
```

FIG. 12

EXAMPLE OF COLLECTOR TAG

```
try { bt_data('source', eval('bt_parameter(\x22Source\x22)'));
} catch(e) { bt_handle_exception(e); }
try { bt_data('seo keywords', eval('bt_meta(\x22keywords\x22)'));
} catch(e) { bt_handle_exception(e); }
```

FIG. 13

EXAMPLE OF USER ID SYNCHRONIZATION TAG

```
document.write('\n\x3cimg src\x3d\x22//pixel.mathtag.com/event/img
?mt_id\x3d103228\x26mt_adid\x3d100511\x26redir
\x3dhttp%3A%2F%2Fs.thebrighttag.com%2Fcs%3Ftp%3Dmm
%26uid%3D%5BMM_UUID%5D\x22 width\x3d\x221\x22
height\x3d\x221\x22 /\x3e \n');
```

FIG. 15

EXAMPLE OF HTTP GET WITH COLLECTED DATA TO TRACKING SERVER

```
HTTP GET
Location:    http://tagserve.stage.thebrighttag.com/tag?site=xAzftcN
    &referrer=http%3A%2F%2Fwww.sample.com%2F%3FSource%3Dtest
    &_cb_bt_data(%27source%27)=test
Host:    tagserve.stage.thebrighttag.com
User-Agent: Mozilla/5.0 (Macintosh; Intel Mac OS X 10.6; rv:2.0.1)
    Gecko/20100101 Firefox/4.0.1
Accept: */*
Accept-Language: en-us,en;q=0.5
Accept-Encoding: gzip, deflate
Accept-Charset: ISO-8859-1,utf-8;q=0.7,*;q=0.7
Keep-Alive: 115
Connection: keep-alive
Referer: http://carerunner3.thebrighttag.com/?Source=test
Cookie: bt=dTfIit-ptycW_aP4TCH-nnYT1OMSYsULdPKuuk4lArY
```

FIG. 18

EXAMPLE OF HTTP GET TO DATA RECEIVER WEB SERVER

```
HTTP GET
Location:
http://pixel.mathtag.com/event/js?mt_id=103228&mt_adid=100511
Host: pixel.mathtag.com
User-Agent: Mozilla/5.0 (Macintosh; Intel Mac OS X 10.6; rv:2.0.1)
Gecko/20100101 Firefox/4.0.1
Referer: http://www.sample.com/?i_cntr=1307127919631
Cookie: uuid=4de99345-95d2-574b-ab27-bce792b75f10
X-Forwarded-For: 192.168.10.10
```

FIG. 19

UNIFIED COLLECTION AND DISTRIBUTION OF DATA

CROSS-REFERENCE TO RELATED APPLICATIONS

This application is a continuation of application Ser. No. 13/161,408, filed Jun. 15, 2011, which claims the benefit of U.S. Provisional Application Nos. 61/355,519 and 61/355,532, both filed Jun. 16, 2010, and 61/377,753, filed Aug. 27, 2010, all which are incorporated herein by reference.

FIELD OF THE INVENTION

This invention relates generally to electronic publishing and commerce and, more particularly, to collection and distribution of marketing and user behavior data.

BACKGROUND OF THE INVENTION

Commercial webpages include code that makes web server requests specifically for the purpose of recording marketing and user interaction events for subsequent analysis. Commonly referred to as a tracking tag, this code is interpreted by a user's web browser as part of the instruction set for rendering and controlling the behavior of a webpage.

Examples of the data analysis made possible by tracking tags include, but are not limited to: the geographic location of the user, the number of times a webpage has been viewed by a unique user, the links on a page that a user has clicked, the ads that were included on a page, whether the user accessed a page in response to an ad or marketing campaign, and how much money a user spent on a website after responding to a particular campaign.

Website owners may add tracking tags by appending them to the HTML source code of each webpage of their website. Tracking tags also may be included within content on a page that is linked from third-party content providers—for example, ads, video players, news feeds, and blogs. Tracking tags may send data to the website owner's servers or to third-party servers, and this data may be used for the benefit of the website owner, advertisers, advertising and marketing agencies, data aggregators, data analysis services, and other parties. The parties that receive such data are referred to generally as "data receivers."

Tracking tags are implemented in a number of ways, the most common of which are HTML anchor or iframe tags that request a file from a web server and JavaScript statements that post data to a web server of an intended data receiver party. The response from the web server often sets a browser cookie with data that is used to anonymously identify a particular user on subsequent requests. Typically, data analysis products and services provide these tracking tags, often in the form of HTML tags or JavaScript statements, to website owners and third-party content providers, who must then copy the tracking tag code into the HTML source code for the webpage or linked content item that is to be tracked.

Tracking tags may collect data elements implicitly or explicitly. Implicit data collection occurs when a tracking tag passes data elements that can be extracted deterministically from site/application context without custom data integration code. Data collected implicitly are referred to as "implicit data elements." Examples of implicit data elements include without limitation: (1) HTTP request headers, such as the URL of the object requested, the user's IP address, user-agent, language, referring URL, and cookie values; (2) client object values and events, such as those defined by the World Wide Web Consortium Document Object Model (DOM) and application development frameworks such as Adobe Flash, Apple iOS, Google Android, Facebook API, etc.; and (3) "well-known content," such as document title, unparsed document body, and other document elements that can be inferred through commonly used markup identifiers such as page description, keywords, headings, images, etc.

Data collected explicitly are referred to as "explicit data elements." The word "explicit" indicates that the data element has been explicitly defined by a data producer. Unlike implicit data elements, explicit data elements cannot be extracted deterministically from the site/application without custom data integration code. Explicit data elements vary greatly based on request context. Examples of explicit data elements include without limitation: (1) machine-interpreted variables and expressions, such as those used by JavaScript when rendering a webpage or Adobe ActionScript when running a Flash application; (2) arbitrary structured data, such as URL query string parameters and "meta" tags, and similar key/value pairs where the structure and content are defined entirely by the site/application; (3) arbitrary unstructured content, which must be parsed or otherwise derived from a document body or subsection thereof.

Explicit data elements are enumerated in website/application markup and/or in the request context—either as variables/expressions, arbitrary structured data, or arbitrary unstructured content. Mechanisms for enumerating data elements include, but are not limited to, URL query string parameters, HTML meta tag values, JavaScript variables, and unstructured content, examples of which are shown in FIG. 1.

Because explicit data collection requires site/application owners to write custom data integration code, maintaining tracking tags for multiple parties is cumbersome and can create technical issues. Though each tracking tag uniquely encodes explicit data based on the interface specification of its data collection servers, essentially the same data elements and values are passed to multiple parties. Because marketing and user behavioral data products and services base their analysis on the same superset of interaction events, their tracking tags collect nearly identical data elements. The differences between these otherwise redundant tracking tags can be characterized as implementation details, such as parameter and variable names, value assignments and the particular subset of interaction events that is relevant to the analysis product or service.

A few of the technical and commercial inefficiencies introduced by the proliferation of tracking tags are listed below.

(1) Multiple tracking tags make webpages more complex to implement and debug because each tracking tag's code must be checked for syntax and logic errors, each webpage must be tested to ensure correct functionality after a tracking tag has been incorporated into the source code, and code changes from tracking tag providers must be integrated into webpages on a regular basis.

(2) Because tracking tags must be interpreted by a user's web browser or other user agent, each tracking tag adds to the amount of time that it takes to download a page and execute its HTML and JavaScript code. Processing multiple tracking tags may materially impair site performance.

(3) If a user's web browser cannot contact the particular web servers requested by a tracking tag, then a webpage may not load correctly. As more tracking tags are added to a webpage, the possibility for load errors increases.

(4) If a user exits a webpage before all tracking tags finish loading, then some parties will not receive a complete set of data from that user. Incomplete data impacts the quality of data analysis products, skews marketing campaign performance reports and impacts payments based on commercial terms related to campaign performance measurements.

(5) The removal of tracking tags from a website also introduces complexity and requires effort to debug. Because of this, website administrators may not remove tracking tags in a timely manner after terminating relationships with a data receiver. This potentially provides a terminated data receiver with unlicensed access to marketing and user behavioral data, and unnecessarily adds to the performance problems caused by multiple tracking tags.

(6) Tracking tags are used to attribute the source of conversion events such as purchases and user registrations to a particular marketing campaign. This attribution is the basis for commercial terms that specify a cost-per-acquisition (CPA) payment schedule. Websites often operate a number of CPA campaigns with different marketing partners, and each partner provides its own tracking tag. Because a user may have engaged several marketing partners leading up to a conversion event, multiple parties may claim attribution for the event. Commercial agreements between websites and marketing partners specify a methodology for determining which party gets paid when multiple attributions exist—for example, the last campaign that influenced the conversion event is commonly the only one entitled to payment. In practice, however, websites often pay all parties that contributed to a conversion event because there is no effective way to enforce contractual attribution methodologies. Multiple tracking tags are among the root causes for redundant payments because each party is collecting its own data without a commonly accepted way to reconcile conflicting attribution.

Thus, there is a pressing need to facilitate data collection by multiple parties without implementing multiple tracking tags. A method is needed to reduce the redundant data collection that executes within a web browser, while still providing each party a complete set of data. Methods exist to aggregate tracking tags from multiple parties into a single concatenated HTML or JavaScript code block, often referred to as "piggybacking" These "piggybacking" methods do not mitigate any of the inefficiencies listed above because each party's tracking tag code still must be executed by the user's web browser. What is needed instead of "piggybacking" is a method to collect data within the user's web browser only once, then to distribute the data to those parties that are entitled to receive it.

A solution is also needed to address consumer privacy. Data producers, such as website operators, advertisers, and third-party content providers distributing information to consumers, collect and use data about a consumer to direct many actions including content personalization, aggregating feedback for improvement, processing transactions, administering promotions, or distributing marketing emails. A data producer's right to collect data for its own use is typically communicated to the consumer by a "terms of service" agreement or similar document made available to the consumer. When consumers interact with content published by data producers, they are typically identified by a data producer's cookie stored within the consumer's web browser.

The concept of "opt-out" refers to methods by which consumers can avoid data collection as a declared election. This is typically accomplished via a webpage provided by the data producers or data receivers that allows the consumer to indicate their intent to opt-out, effectively disconnecting the consumer's browser cookie from further data collection. An opt-out policy infers that data collection is by default valid for consumers that have not explicitly opted-out.

From a technical perspective, opt-out enforcement results in the affected data producer or data receiver writing the consumer's opt-out intent to a cookie they can access. Awareness of this cookie gives the data producer or data receiver the means to ensure that data is not collected according to the opt-out policy.

The concept of "opt-in" refers to methods by which consumers can express permission to allow a data producer or data receiver to collect or use data. An opt-in policy infers that data collection by data producers or data receivers against consumers is by default invalid.

Inefficiencies and problems are introduced with the current landscape of enforcement of privacy and data collection policies. While data producers own the creation of all the content on which data is collected, they do not own the process of data collection by the data receivers. Data producers lack an effective way to respond to the consumer's preferences regarding data collection. As an example, if the consumer specifies a preference that their data should not be collected for targeted advertising purposes—managed by particular data receivers—a data producer which has integrated the data receiver's tags has no ability to stop the data collection. Data producers also lack the ability to take action against a consumer's privacy preferences. Data producers lack technology which allows them to offer and enforce privacy rights management on a site-specific level—where consumers declare their privacy preferences on the data producer's site—as well as a network-wide level where consumers declare their privacy preferences as general rules for the content they consume across the internet.

Thus what is also needed is a system and method of enforcement of privacy and data collection policy that allows data producers to support a consumer's privacy rights on a site-wide or network-wide basis.

SUMMARY OF THE INVENTION

Briefly and in general terms, the present invention is directed to a network communication method. In aspects of the present invention, a method comprises receiving a stub tag request from a user device, the user device having received source code of a visited webpage associated with a website. The method further comprises determining, from the received stub tag request, a site configuration that identifies one or more webpages of the website and identifies one or more data receiver tags assigned to each one of the webpages of the website. The method further comprises identifying the visited webpage at least in part from one or more parameters from a network request header. The method further comprises constructing a response to the stub tag request, the response including at least one of a collector tag, a browser-direct data distribution tag, and a user ID synchronization tag. The method further comprises sending the response to the user device.

In aspects of the present invention, a method comprises creating a data collection setting for a website, creating a data distribution setting for the website, and inserting a stub tag into source code of a webpage of the website.

In aspects of the present invention, a method comprises processing effective source code of a webpage of a website, the effective source code including a stub tag. The method further comprises sending a stub tag request to a tracking server, the stub tag request performed according to the stub tag. The method further comprises obtaining a response to the stub tag request, the obtained response including at least one of a collector tag, a browser-direct data distribution tag, and a user ID synchronization tag.

The features and advantages of the invention will be more readily understood from the following detailed description which should be read in conjunction with the accompanying drawings.

BRIEF DESCRIPTION OF THE DRAWINGS

FIG. 1 shows examples of how data elements can be enumerated, the data elements capable of being collected at a later time in accordance with a tag code;

FIG. 2 shows examples of a stub tag to be implemented in a system and method of the present invention for collecting and distributing data elements;

FIG. 4 is a table showing data elements associated with data binding expressions, the table representative of at least some information in a data collection settings database;

FIG. 5 is a table showing data elements associated with data receiver definitions, the table representative of at least some information in a data receiver settings database;

FIG. 6 shows a page in the data producer user interface for creating and saving the data collection settings;

FIG. 9 is an example of code that is remotely cached and referenced by the stub tag;

FIG. 10 is an example of code forming at least a part of the stub tag request;

FIG. 11 is an example of code used by the tracking server to identify the visited webpage from information in the stub tag request;

FIG. 12 is an example of tag code, in the form of a browser-direct data distribution tag, provided by the tracking server to the user device in response to the stub tag request, the browser-direct data distribution tag enabling the user device to collect and distribute data elements to multiple data receivers without passing the collected data elements to the tracking server;

FIG. 13 is an example of tag code, in the form of a collector tag, provided by the tracking server to the user device in response to the stub tag request, the collector tag enabling the user device to collect and distribute data elements to multiple data receivers by passing the collected data elements to the tracking server;

FIG. 15 is an example of tag code, in the form of a user ID synchronization tag, provided by the tracking server to the user device in response to the stub tag request, the user ID synchronization tag enabling the user device to initiate a user ID synchronization process with data receiver web servers;

FIG. 18 is an example of code for sending the collected data elements from the user device to the tracking server in accordance with the collector tag;

FIG. 19 is an example of code for sending the collected data elements from the user device to the data receiver web servers in accordance with the browser-direct data distribution tag;

DETAILED DESCRIPTION OF PREFERRED EMBODIMENTS

Figure 3:
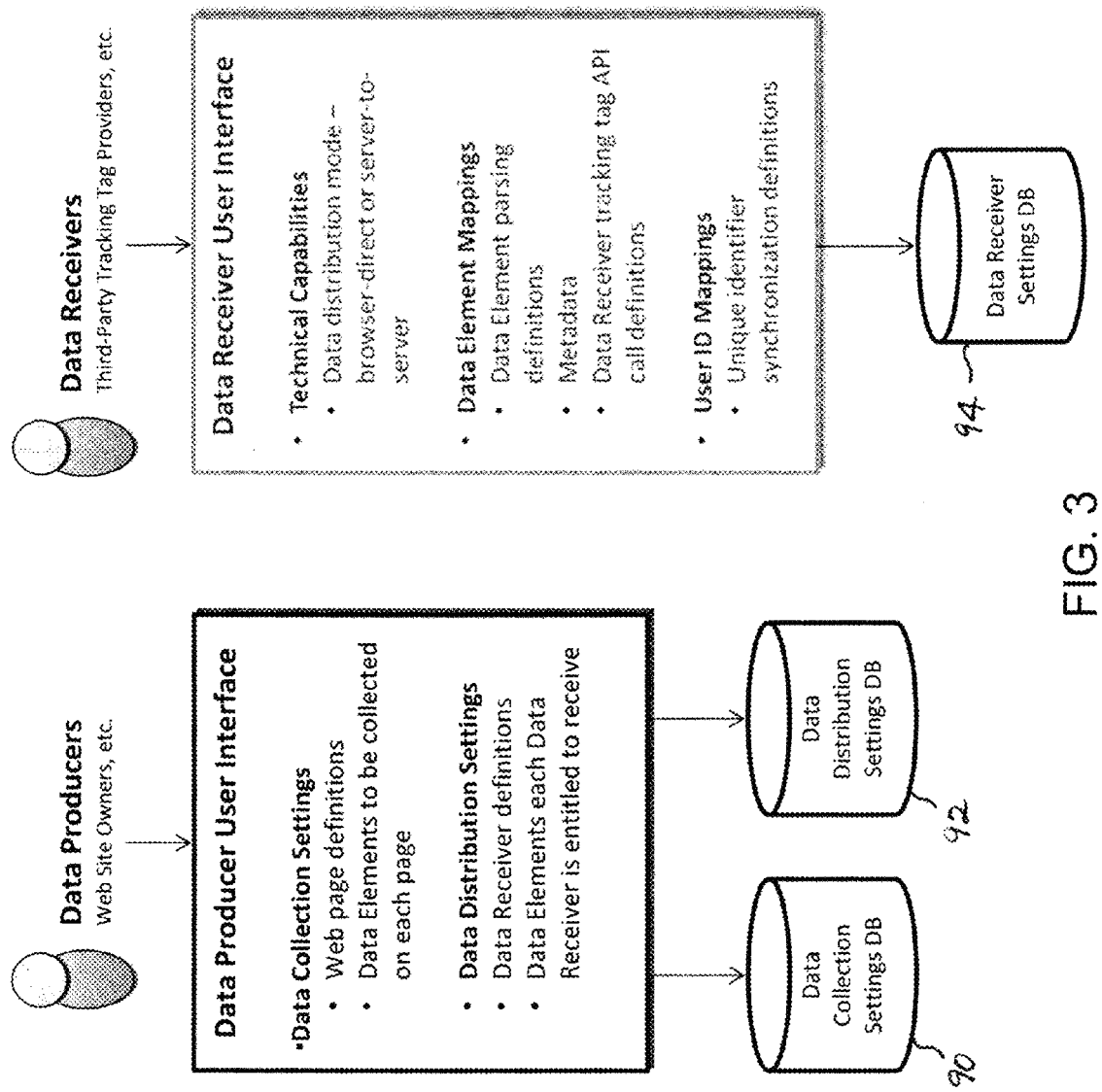
FIG. 3 is a flow diagram showing how data producers may, through the use of a data producer user interface, create and save data collection settings in a database and create and save data distribution settings in another database; and showing how data receivers may, through the use of a data receiver user interface, create and save data receiver settings in yet another database.

Embodiments of the present invention include a system and method for providing a data binding tag, also referred to as a stub tag, to the website/application code. The stub tag collects explicit data elements, and provides a mechanism by which representations of data receiver tracking tags can be dynamically unified and written into the website/application code that is being evaluated by a user's device. The system and method integrates with each data receiver's existing data collection mechanisms, and matches collected data elements to the unique identifiers required by each data receiver's collection mechanism.

Referring now in more detail to the exemplary drawings for purposes of illustrating embodiments of the invention, there is shown in FIG. 2 non-limiting examples of the stub tag. Optionally, the basic structure of the stub tag can be nothing more than what is in the examples of FIG. 2. In EXAMPLES 1 and 2, the stub tag only has a <script> section. In EXAMPLE 3, the stub tag has a <script> section and a <noscript> section in the event that a web browser or other user agent does not support JavaScript. The stub tag can be substantially identical for each webpage of the website. EXAMPLE 1 can be inserted in the effective source code for webpages of a first website, EXAMPLE 2 can be inserted in the effective source code of webpages of a second website, and EXAMPLE 3 can be inserted in the effective source code of webpages of a third website.

In some embodiments, as shown in FIG. 2, the <script> section of the stub tag includes a reference to script code that is cached remotely in a server separate and distinct from the web servers that host the website. The <noscript> section includes a statement, not in JavaScript, that references the remotely cached script code. In other embodiments, the stub tag includes a <noscript> section and has no <script> section.

In all three illustrated examples, the stub tag is defined in HTML capable of being evaluated in a web browser, and the remotely cached script code is named "tag.js". It is to be understood that a different name can be used for the remotely cached script code, and the stub tag can be structured in other ways and still provide the same function as the illustrated examples. In other embodiments, the stub tag is defined in a language for evaluation by a user agent other than an internet web browser on a personal computer. The stub tag can be defined in a language compatible with the application runtimes of mobile device operating systems and/or interactive cable and satellite television network interface devices. Thus, it is to be understood that the stub tag can vary and can depend on the type of user device.

The illustrated stub tag examples are not a concatenation of multiple tracking tags into a combined code statement. The stub tag eliminates the need to have data receiver tracking tags separately integrated or written into the website/application code. The stub tag is generic in the sense that no change is needed to the stub tag, and hence no change is needed to the website/application code, in order to accommodate addition, removal and changes to tracking tags of data receivers.

As described in detail below, the stub tag allows for return of code that enables the user device to collect explicit data elements and send the collected data, in the appropriate format, to multiple data receivers who are entitled to collected data. The particular data elements to be collected and how they are sent to data receivers is predetermined, at least in part, by data producers.

FIG. 3 shows how data producers and data receivers can make and change settings associated with data collection and distribution. A user interface allows data producers, such as website owners, to define data collection and data distribution settings for each webpage within a website. Another user interface allows data receivers, such as third-party tracking tag providers, to define data receiver settings.

Data collection settings specify all data elements that can possibly be collected on a webpage. Data collection settings are stored in data collection settings database 90. Data distribution settings specify which data elements each data receiver is entitled to receive. Data distribution settings are stored in data distribution settings database 92.

Data receiver settings specify data receiver technical capabilities, data element mappings and user ID mappings. As used herein "ID" is an abbreviation for the word "identification." Data receiver settings are stored in data receiver settings database 94. Data receiver technical capabilities include an indication of whether the data structures collected by the data receiver can be processed through an intermediate server (server-to-server requests), or require direct communication between a user device and the data receiver's server (e.g., browser-direct access). Data element mappings define the superset of data elements that the data receiver can receive, how data elements are parsed by the data receiver API, data receiver-specific metadata and the data receiver tracking tag API calls that are used to send data to the data receiver. User ID mappings define how unique anonymous identifiers for users are synchronized between the data producer, data recipient and data distribution system.

FIG. 4 shows an arrangement of information in data collection settings database 90 according to some embodiments of the present invention. An owner or administrator of website A specifies a set of data elements that can be collected from each of the webpages of website A. Each data element is given a unique name by the administrator. The set of data elements can be the same or different from webpage to webpage. The administrator specifies for each data element a data binding expression (symbolized as "DBE") that relates how the data element is obtained, inferred, or generated from a webpage.

As used herein in the context of a website, the words "administrator, "owner," and "operator" are used interchangeably to refer to natural person with authority in the administration of the website.

An administrator of website B specifies what data elements can be collected from each of the webpages of website B and specifies for each data element an appropriate data binding expression. An administrator of website C specifies what data elements can be collected from each of the webpages of website C and specifies for each data element an appropriate data binding expression. Although in FIG. 4 the number of websites, the number of data elements per webpage, and the number of webpages per website are limited to three, it is to be understood that data collection settings database 90 can include more websites and can handle a greater number of data elements per webpage and webpages per website.

FIG. 5 shows an arrangement of information in the data distribution settings database 92 according to some embodiments of the present invention. An administrator of website A specifies a set of data elements to be collected for and distributed to one or more data receivers. The set of data elements can be the same or different from one data receiver to another, and can include any number, from one to all, of the data elements identified in FIG. 4 for website A. The administrator specifies for each data element a definition (symbolized as "DEF") that is utilized and recognized by a data receiver. Each data receiver definition associates a data element, previously defined by the administrator, with a particular format in which the data receiver expects to receive the data element. Each pairing of a data element and a data receiver definition can be referred to as a data mapping expression. Data distribution settings database 92 provides a map between data elements explicitly defined by the website administrator and data desired by a data receiver.

The owner of website B specifies a set of data elements that are to be collected for and distributed to one or more data receivers and specifies for each data element a corresponding data receiver definition. The owner of website C specifies a set of data elements that are to be collected for and distributed to one or more data receivers and specifies for each data element a corresponding data receiver definition. Although in FIG. 5 the number of websites, the number of data elements per data receiver, and the number of data receivers per website are limited to three, it is to be understood that data distribution settings database 92 can include more websites and can handle a greater number of data elements per data receiver and data receivers per website.

Figure 6:
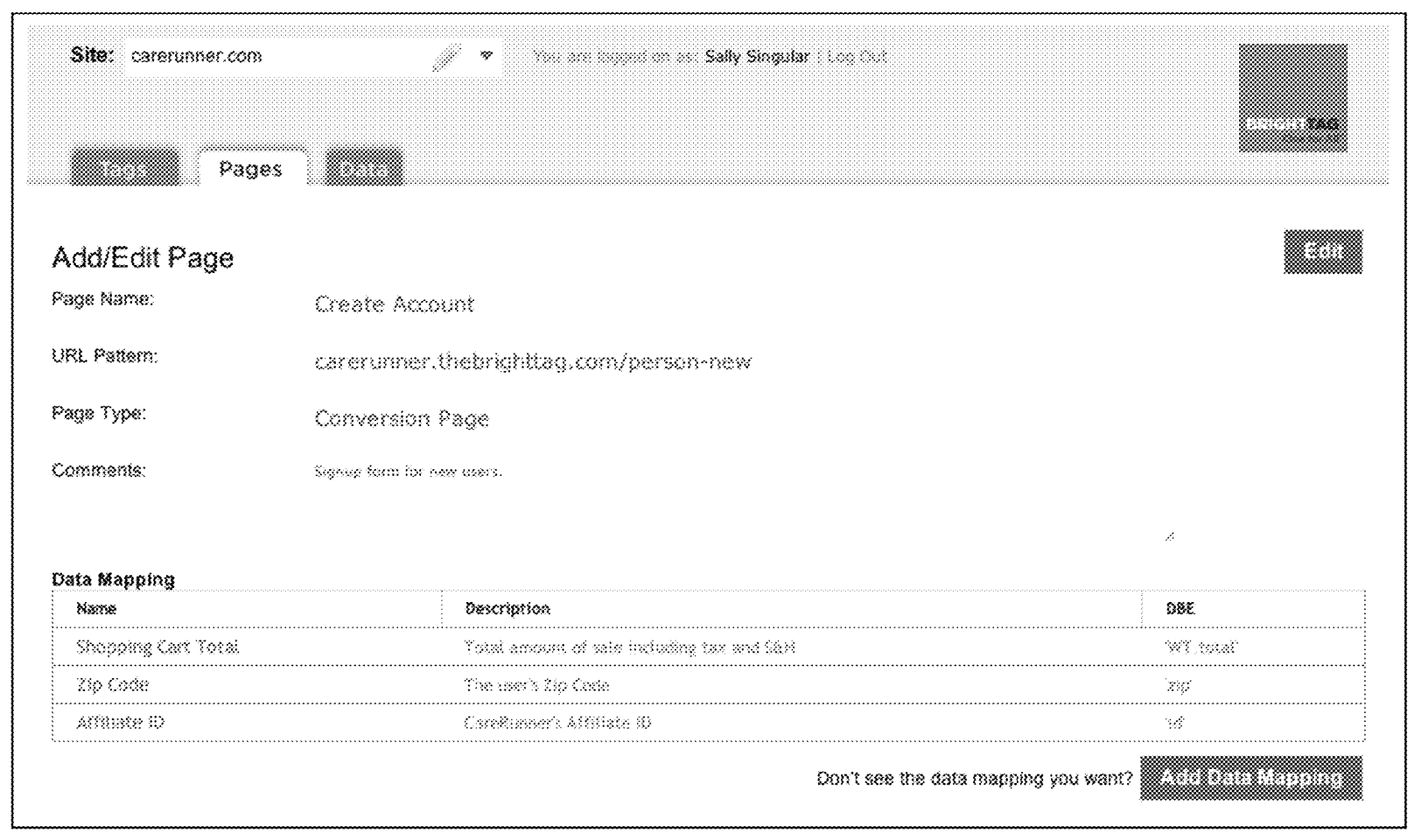
Figure 7:
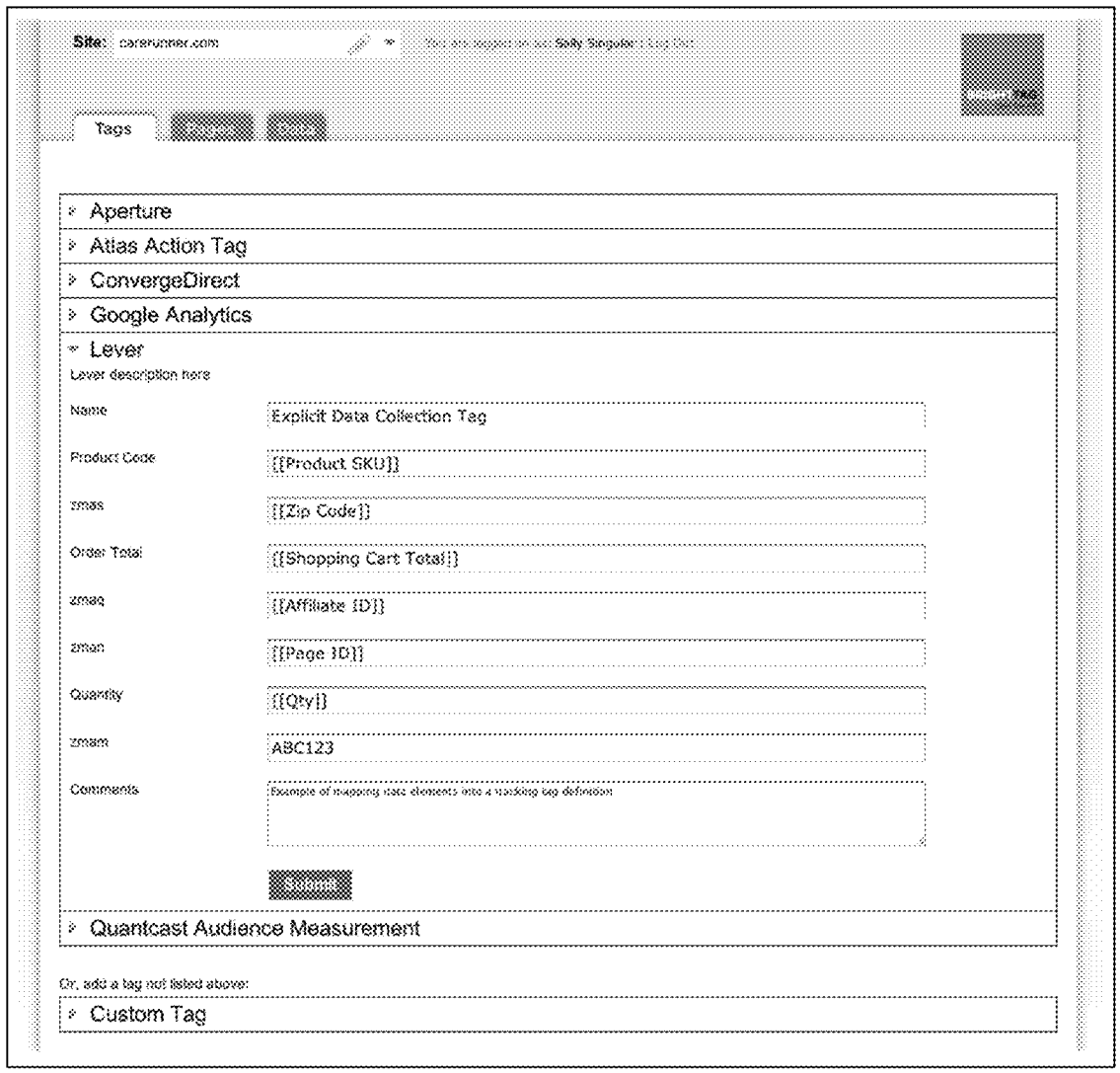
FIG. 7 shows a page in the data producer user interface for creating and saving the data distribution settings.

FIGS. 6 and 7 show a non-limiting example of the data producer user interface referenced in FIG. 3. The data producer user interface is shown as it would appear on a graphical display, such a computer display screen. As shown in FIG. 6, an administrator for a particular website can specify, for each webpage, unique names for a plurality of explicit data elements, a brief description for each data element, and a data binding expression (DBE) for each data element. In FIG. 6, the webpage is called Create Account and the data elements for the Create Account webpage have been given the names Shopping Cart Total, Zip Code, and Affiliate ID. The names, descriptions, and DBEs can be altered by clicking on the "Edit" button. More names, descriptions, and DBEs can be added by clicking on the "Add Data Mapping" button.

The website administrator explicitly defines data elements with data binding expressions (DBEs). The DBE defines how the explicit data element has been enumerated or defined in relation to the webpage. As previously discussed, explicit data elements can be enumerated in the application markup of the webpage and/or in the HTTP request context. Examples of DBEs include without limitation: (1) "variable_name"—binds a JavaScript variable; (2) "evaluation"—includes a JavaScript expression to be evaluated by the stub tag at runtime; (3) "bt_parameter("color")"—includes the value of the "color" parameter from the URL Query String; (4) "bt_meta ("zipcode")"—includes the value of the "zipcode" meta tag from the webpage document; and (5) "bt_xpath("//div[@class='shopping_cart_item']")"—includes the unstructured content of the "Shopping_Cart_Item"<div> element from the webpage document.

The relationship between data binding expressions (DBEs) and data elements can be stored in data collection settings database 90, an example of which is represented in FIG. 4. Information stored in data collection settings database 90 can be arranged in ways other than what is shown in FIG. 4.

As shown in FIG. 7, an administrator for a particular website can, for each of a plurality of potential data receivers, specify or associate data receiver definitions with explicit data elements previously defined by the administrator. Next to each name for a data receiver definition (for example zmas, Order Total, and zmaq) is a text field in which the administrator can enter a data element name (for example, Zip Code, Shopping Cart Total, and Affiliate ID) previously defined by the website administrator, such as in FIG. 6. The entire set of data receiver definitions corresponds to a data receiver tag. In FIG. 7, the name of the data receiver is "Lever" and the name given by the website administrator to the Lever's data receiver tag is "Explicit Data Collection Tag." The administrator can define data receiver tags for other data receivers, such as Aperture, Atlas Action Tag, ConvergeDirect, and Google Analytics. The relationship between data receiver definitions and data elements can be stored in data distribution settings database 92, an example of which is represented in FIG. 5. Information stored in data distribution settings database 92 can be arranged in ways other than what is shown in FIG. 5.

Figure 8:
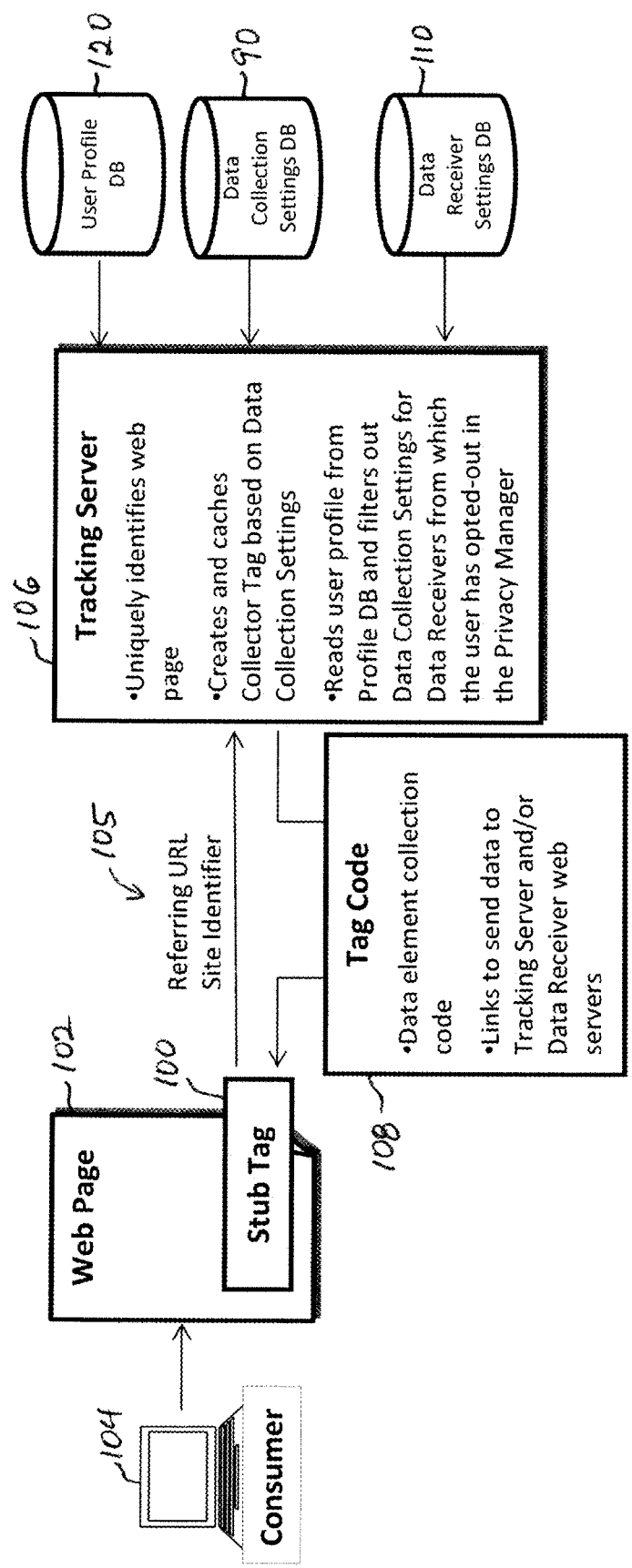
FIG. 8 is a flow diagram showing how multiple data receiver tags can be unified in a single tag code that is returned in reply to a stub tag request to a tracking server from a user device visiting a webpage, the communication enabled by a stub tag in the source code of the visited webpage.

FIG. 8 shows how one or more data receiver tags, as may be defined in the data producer interface of FIG. 7, are unified in a single tag code that is returned in reply to a request initiated by a stub tag. The term "unified" refers to the characteristic that the tag code includes a single data collection code for each data element to be collected, and the data collection code is executed only once for the respective data element to create a common variable that is then referenced and translated by one or more data receiver tags that are configured to receive that data element. Use of a single data collection code for each data element and the resultant common variable obviate redundant data collection that occurs with simple aggregation of data receiver tag codes for the same data element.

Stub tag 100 has been inserted within the effective source code of visited webpage 102. "Effective source code" refers to source code as received by either the user device or software application being run by the user device. As used herein in the context of a website or webpage, "effective source code" and "source code" are the same and used interchangeably.

Stub tag 100 can be a script code that references a JavaScript code, for example "tag.js". The exact same script code can be used in all webpages of the website. The stub tag may be introduced in the effective source code through a variety of ways, such as through inclusion in a common code template, inclusion in a "global footer", and injection through a reverse proxy server.

The source code of the visited webpage is called by user device 104. Examples of user devices include without limitation a personal computer, mobile telephone, personal digital assistant, computer tablet, cable television receiver box, satellite television receiver box, and video game console. The user device runs a software application, or user agent, that processes the source code of the visited webpage. In some embodiments of the present invention, the user agent is an Internet web browser. As used herein, the term "web browser" is representative of any user agent implementing a network protocol used in communications within a client-server distributed computer system. Systems and methods of the present invention can be implemented with other user agents, for example and without limitation, the application runtimes of mobile device operating systems such as Apple iOS, Google Android and RIM Blackberry OS, and the application runtimes of interactive cable and satellite television network interface devices provided by vendors such as Cisco-Scientific Atlanta, Motorola, Hughes-DirecTV and Echostar-Dish Network. The present invention is not limited to a particular user device or user agent.

When webpage source code containing stub tag 100 is called by user device 104, user device 104 sends stub tag request 105 to tracking server 106. Communication between user device 104 and tracking server 106 can be made through any type of network or group of networks, including without limitation the Internet, a metropolitan area network, a wide area network, and a local area network. Tracking server 106 is separate and distinct from user device 104 and servers hosting the visited webpage. Tracking server 106 may comprise one or more electronic network servers. Tracking server 106 can be, for example and not limitation, a PowerEdge™ T410 Server available from Dell Inc. of Round Rock, Tex.

In some embodiments of the present invention, the stub tag request has two parts: a first call and a second call. User device 104 initiates a first call to tracking server 106 to retrieve from tracking server 106 additional script code, for example, the script code associated with or contained within "tag.js". That additional script code can be as shown in FIG. 9. The contents and structure of the additional script code can vary from what is illustrated and still provide substantially the same or similar function.

After user device 104 receives the additional script code, the additional script code initiates a second call that sends configuration parameters to tracking server 106. In some embodiments, the configuration parameters includes a site ID ("Site Identifier" in FIG. 7) and referrer URL. In EXAMPLES 1, 2 and 3 of FIG. 2, the site IDs are abc123, xAzftcN, and 382hdu9. Configuration parameters can be sent to tracking server 106 in a network request header of the second call. In some embodiments, the second call or request from user device 104 to tracking server 106 can be in the form of an HTTP GET request, an example of which is shown in FIG. 10. It is to be understood that an HTTP GET request can be structured in other ways and still provide substantially the same or similar function as the illustrated example.

Next, tracking server 106 uniquely identifies visited webpage 102. Identification of visited webpage 102 can be inferred by tracking server 106 from configuration parameters in the network request header. Identification of visited webpage 102 by tracking server 106 can be performed with the use of an inference algorithm. A code fragment representative of an inference algorithm is shown in FIG. 11. The contents and structure of the code fragment can vary from what is illustrated and still provide substantially the same or similar function.

Next, tracking server 106 constructs a response to the stub tag request (for example, the second call) and sends the constructed response to user device 104. As will be discussed below, the response is constructed dynamically in the sense that the response is not constructed before the stub tag request is received and the response contents are specifically tailored to the particular stub tag request. Dynamic construction allows the response to vary from one user device to another, vary from one visited website to another, and vary according to settings previously provided by the website owner, settings provided by data receivers, and/or settings provided by a user of the user device.

Referring again to FIG. 8, the constructed response for some embodiments is in the form of tag code 108 for collecting data elements according to one of more data receiver tags for visited webpage 102. The appropriate data receiver tags may have been associated with visited webpage 102 by a website administrator using the data producer interface of FIGS. 6 and 7. Tag code 108 can include any number of collector tags and/or browser-direct data distribution tags which have been determined to be appropriate for the particular stub tag request that was received. When it has been determined that no collector tag and no browser-direct data distribution tag is appropriate an empty markup, instead of tag code 108, is returned to user device 104. The empty markup contains no collector tag and no browser-direct data distribution tag.

Prior art systems and methods require website administrators to explicitly define separate documents, commonly referred to as "containers", into which they manually pasted tag code, or concatenated or aggregated all data receiver tag code into a single tag code file, from which individual tag calls were parsed by the user agent. These steps of manually pasting tag code into containers and implementing simple aggregation of multiple data receiver tag code are absent from some embodiments of the present invention. Such steps can be avoided when tracking server 106 dynamically constructs tag code 108, in response to stub tag request 105, to include only those data elements and data receiver tags that are configured for visited webpage 102 based on the configuration matching settings.

A collector tag includes links for user device 104 to send collected data to tracking server 106, which relays the collected data to web servers of data receivers as described further below. A browser-direct data distribution tag includes links for user device 104 to send collected data directly to the web servers of data receivers as described further below.

In some embodiments, the constructed response does not include any tracking tag code obtained from a data receiver to which collected data are to be later delivered. Instead, for example, the constructed response includes a unified code, representative of the multiple data receiver tracking tag codes, configured to avoid redundant or duplicative collection of essentially the same data. When multiple data receivers desire the same data element, the unified code causes collection of that data element only once. The unified code is not a simple aggregate code block of tracking tag code from multiple data receivers. Such an aggregate code block would result redundant or duplicative data collection in cases where the data receivers desire to receive substantially the same type of data.

In some embodiments, a browser-direct data distribution tag includes at least one data receiver instruction retrieved from data receiver settings database 110. Each data receiver instruction can include a tag code specified by a data receiver for collecting explicit data elements and including instructions for transforming collected explicit data elements into a format expected by the data receiver. A browser-direct data distribution tag allows for transfer of collected data elements via a browser-direct request (such as browser-direct request 114 of FIG. 14). A non-limiting example of a browser-direct data distribution tag is shown in FIG. 12. It is to be understood that a browser-direct data distribution tag can be structured in other ways and still provide substantially the same or similar function as the illustrated example.

In some embodiments, a collector tag includes a data element collection code (also referred to as data collection code) that collects, for a plurality of data receivers, one or more explicit data elements that would be collected by one or more data receiver tags for the visited webpage. The one or more data receiver tags for the visited webpage correspond to one or more data receiver tags assigned to a particular webpage identified in a site configuration. Tracking server 106 has matched the identity of the visited webpage to the particular webpage. The site configuration identifies one or more webpages of the website and identifies one or more data receiver tags assigned to each one of the webpages of the website. A collector tag allows for transfer of collected data elements via a server-to-server request (such as server-to-server request 114 of FIG. 14). A non-limiting example of a collector tag is shown in FIG. 13. It is to be understood that a collector tag can be structured in other ways and still provide substantially the same or similar function as the illustrated example.

In some embodiments, the site configuration is identified by tracking server 106 by matching the site ID (returned in stub tag request 105 by user device 104 to tracking server 106) to one of a plurality of site configurations stored in data collection setting database 90. Tracking server 106 accesses data collection setting database 90 in order to identify the site configuration appropriate for the site ID. In some embodiments, the site configuration corresponds to information stored in data collection setting database 90 for one of a plurality of websites. In some embodiments, the site configuration corresponds to an arrangement of information, as shown in FIG. 4, for one of a plurality of websites.

Figure 14:
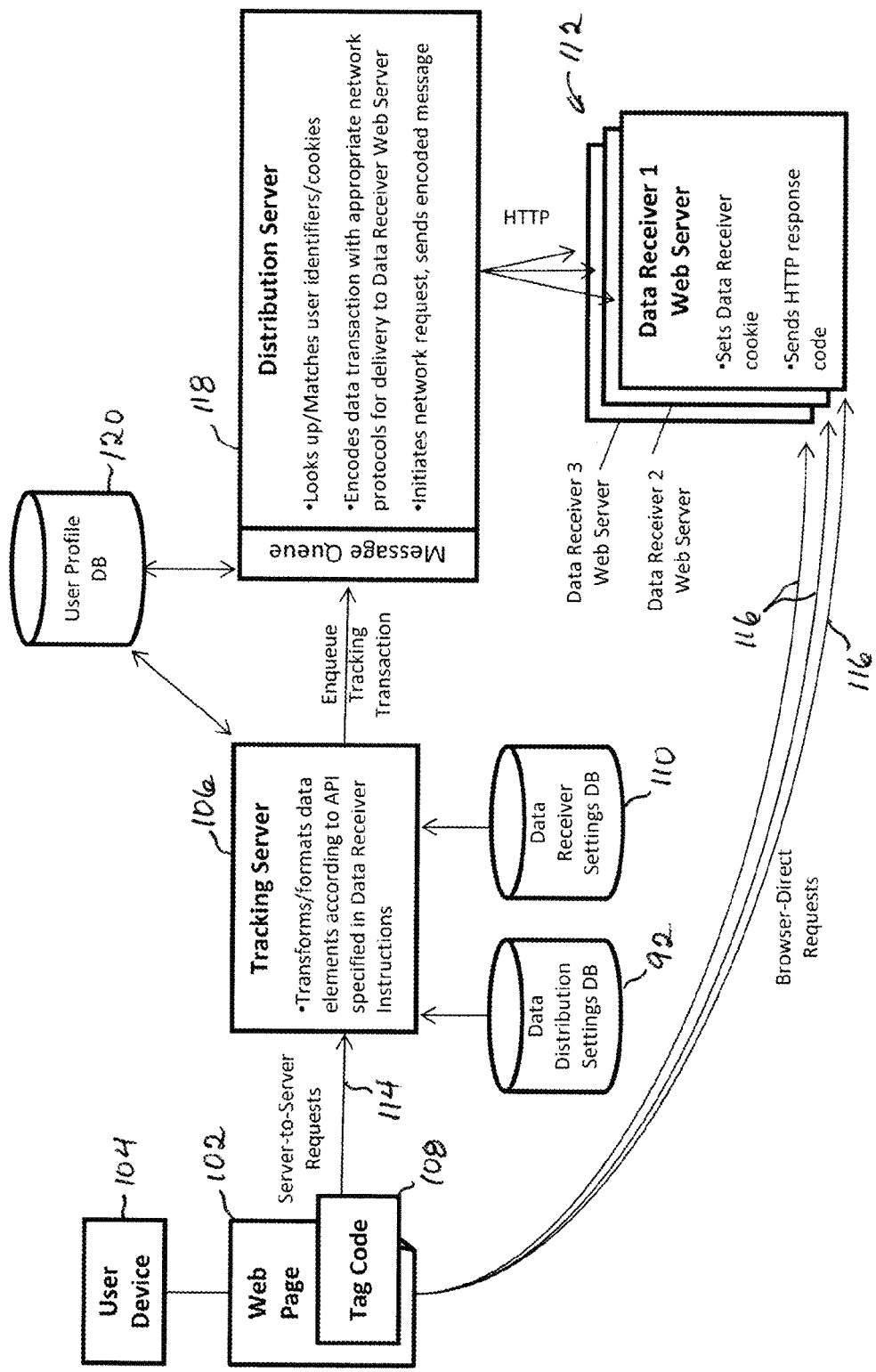
FIG. 14 is a flow diagram showing distribution of the collected data elements, in accordance with the tag code, from the user device to multiple data receivers via a server-to-server request and/or browser-direct requests.

FIG. 14 shows how data collected according to tag code 108 (FIG. 8) is distributed to a plurality of data receiver network servers 112 via server-to-server request 114 and/or browser-direct requests 116. In some embodiments, network servers are web servers. In some embodiments, collected data is distributed to a plurality of data receiver network servers 112 via a single server-to-server request 114 exclusively. In some embodiments, collected data is distributed to a plurality of data receiver network servers 112 via browser-direct requests 114 exclusively. In some embodiments, collected data is distributed to a plurality of data receiver network servers 112 via browser-direct requests 114 and server-to-server requests 114.

Upon receipt of the response from tracking server 106, the user agent running on user device 104 parses tag code 108 in the response. As previously mentioned, the user agent can be a web browser and the web browser parses the tag code 108. Explicit data elements are collected by the user agent according to tag code 108. The collected data elements are representative of the one or more data elements that would be collected by one or more data receiver tags for the visited webpage. Previously, tracking server 106 identified visited webpage 102 and identified the site configuration for the website to which the webpage belongs. From the identity of visited webpage 102 and site configuration, tracking server 106 determined the appropriate data receiver tags for the visited webpage and constructed tag code 108 for collecting, in a unified manner, the data elements required by the data receiver tags.

The collected data elements are sent by the user device 104 to the appropriate data receivers 112 via server-to-server request 114 and/or browser-direct requests 116. As previously indicated, the constructed response to stub tag request 105 can have any number of collector tags and/or browser-direct data distribution tags. A collector tag enables server-to-server request 114, and a browser-direct data distribution tag enables browser-direct request 116. As described below, the constructed response can also include a user ID synchronization tag to enable server-to-server request 114.

Server-to-server data connectivity refers to communication of collected data elements from user device 104 via a route from tracking server 106 and distribution server 118 to web servers 112 of one or more data receivers that are intended to receive the collected data elements. The collected data elements are communicated as a message in the sense of message-oriented middleware. Tracking server 106 bundles all the collected data from user device 104 into a single message, also referred to as a server-to-server tracking transaction. Tracking server 106 places the server-to-server tracking transaction onto a "queue". In this way, the computing resources required for processing incoming collected data are reduced and more requests from various user devices can be processed since data distribution server 118 performs the tasks needed for communicating with data receiver web servers 112.

Distribution server 118 can be, for example and not limitation, a PowerEdge™ T410 Server available from Dell Inc. of Round Rock, Tex.

For server-to-server data connectivity, it is desirable for tracking server 106, distribution server 118, and data receiver web servers 112 to share in common an anonymous identifier that uniquely identifies user device 104 from other user devices that may be sending other stub tag requests and sending their own set of collected data elements.

The anonymous identifier is attached to the data transaction that passes through tracking server 106 and distribution server 118 to data receiver web servers 112.

Server-to-server data connectivity is almost completely transparent; however, an initial "cookie sync" process may be needed to establish the shared anonymous identifier. The cookie sync process is also referred to as a user ID synchronization process. A user ID synchronization tag can be returned to user device 104 as part of the constructed response to stub tag request 105 (FIG. 8). The user ID synchronization tag initiates the user ID synchronization process. It will thus be appreciated that the response constructed by tracking server 10 to stub tag request 105 can include any one or any combination of a collector tag, a browser-direct data distribution tag, and a user ID synchronization tag.

A non-limiting example of a user ID synchronization tag is shown in FIG. 15. It is to be understood that a user ID synchronization tag can be structured in other ways and still provide substantially the same or similar function as the illustrated example. As described below, the user ID synchronization process initiated by a user ID synchronization tag can take one of two forms: redirection or assertion.

When the user ID synchronization process is in the form of a redirection, the user ID synchronization tag includes a link that directs the user agent of user device 104 to the URL of data receiver web server 112. This link causes each of the data receiver web servers 112 to create a persistent identifier for the user device, typically stored in a browser cookie. The persistent identifier is an identification code and serves as the anonymous identifier mentioned above. Data receiver web server 112 includes application code that constructs a redirection link that contains the URL of the distribution server 118 and appends the persistent identifier and other metadata such as data receiver ID used by distribution server 118 to index the persistent identifier in a synthetic cookie and in user profile database 120.

In some embodiments, the persistent identifier and other metadata may be appended as parameters in the URL Query String, or as key-value pairs in the HTTP cookie header. Data receiver web server 112 responds to the user agent of user device 104 with an HTTP redirection response code (typically "HTTP 302-Moved Temporarily") and the redirection link. The user agent processes the HTTP redirection response, causing the user agent to access the redirection link supplied by the data receiver web server 112. The distribution server 118 receives the request for the redirection link, which includes the persistent identifier and other metadata, and stores the result in the synthetic cookie and in User Profile database 120.

The term "synthetic cookie" refers to cookies that are appended to a request by data distribution server 118 as opposed to cookies that are retrieved from the user agent (for example, web browser) of user device 104 as part of a browser-direct request. Data distribution server 118 can submit and accept HTTP cookies to and from data receivers just like a web browser running on user device 104. In this way, distribution server 118 can adapt to data receiver web servers 112 that already have a notion of maintaining user identities and persistent data via cookies without any customization work typically required by the data receivers. Distribution server 118 associates and stores these cookies with the anonymous identifier and ensures that the appropriate cookies are submitted with subsequent requests or communications to data receiver web servers 112.

Figure 16:
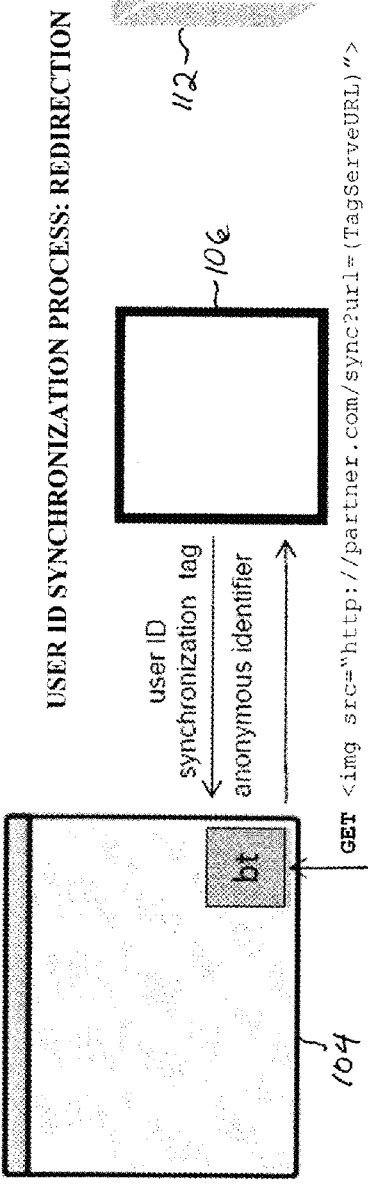
FIGS. 16 and 17 are flow diagrams showing user ID synchronization processes in the form of a redirection and an assertion.

FIG. 16 shows a user ID synchronization process in the form a redirect according to some embodiments of the present invention. A user ID synchronization tag returned to user device 104 causes a call to be made from user device 104 to data receiver web server 112 that results in an HTTP 302 "Found" response from data receiver web server 112 that redirects a GET message to tracking server 106 that includes the user device's anonymous cookie ID which serves as the anonymous identifier mentioned above.

Figure 17:
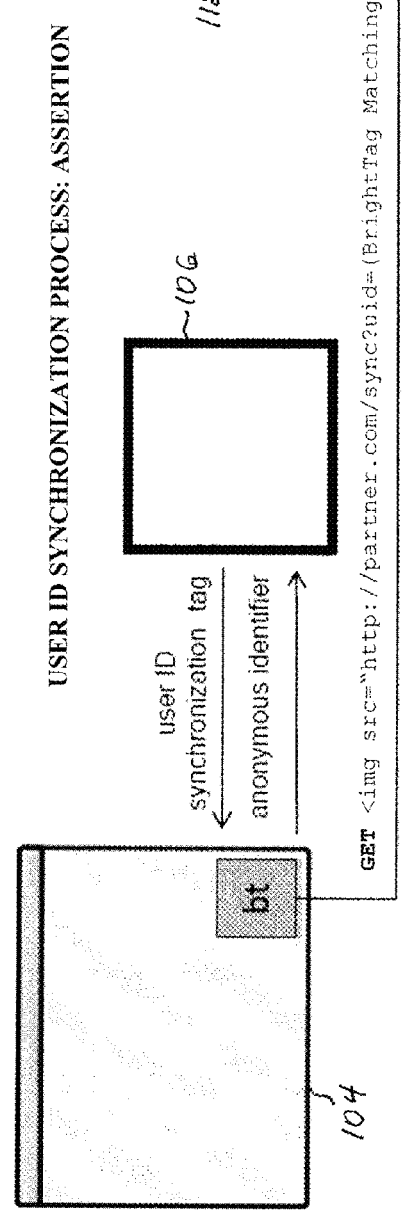

When the user ID synchronization process is in the form of an assertion, the user ID synchronization tag includes a link that directs the user agent of user device 104 to the URL of data receiver web server 112. This link "asserts" a unique identifier maintained by the distribution server 118, typically as a parameter in the URL query string. The unique identifier serves as the anonymous identifier mentioned above. This link causes the data receiver web server 112 to create a persistent identifier for the user, typically stored in a browser cookie. Data receiver web server 112 records the unique identifier and correlates it to its own persistent identifier using mechanisms of the data receiver's design. FIG. 17 shows a user ID synchronization process in the form a redirect according to some embodiments of the present invention.

As mentioned above the collected data elements are sent by the user device 104 to the appropriate data receivers 112 via server-to-server request 114 and/or browser-direct request 116. When sent via server-to-server request 114, tracking server 106 receives data from the user device which have been collected according to tag code 108, which can be the data collection code of the collector tag previously described. The received data is representative of one or more data elements that would be collected by one or more data receiver tags for the visited webpage. Data can be sent to tracking server 106 by way of an HTTP GET request. A non-limiting example of such an HTTP GET request is shown in FIG. 18. It is to be understood that an HTTP GET request can be structured in other ways and contain other data and still provide substantially the same or similar function as the illustrated example.

Referring again to FIG. 14, after receiving the collected data from user device 104, tracking server 106 retrieves at least one data receiver instruction from data receiver settings database 110. Each data receiver instruction includes an API call for contacting a data receiver and includes instructions for transforming the received data from the user device into a format expected by the data receiver. The data receiver definitions in data distribution settings database 92 can be correlated with the instructions for transforming/formatting in data receiver settings database 110. Next, tracking server 106 constructs a server-to-server data transaction including the API call and the received data having been transformed according to the at least one data receiver instruction. The anonymous identifier described above is attached to the server-to-server data transaction.

Still referring to FIG. 14, tracking server 106 enqueues the server-to-server data transaction. Additional tasks needed to properly communicate the collected data elements in the server-to-server data transaction to various data receivers are performed by data distribution server 118 and not by tracking server 106, thereby freeing up tracking server 106 to service a higher number of user device requests than would otherwise be possible. When ready, distribution server 118 dequeues the server-to-server data transaction. Distribution server 118 matches the anonymous identifier attached to the dequeued server-to-server data transaction with a plurality of third-party end user identities. Each third-party end user identity is unique to one of the data receivers. Data distribution server 118 can perform the matching by looking up third-party end user identities in user profile database 120.

The user of user device 104, as well as other users of additional user devices communicating with tracking server 106, has any number of identities, generally one for each data receiver with which the user explicitly or implicitly interacts. An anonymous identifier is maintained for each user. The anonymous identifier would have little value in processing server-to-server request 114 without some coordination with the data receivers. Data distribution server 118 maintains a mapping between the anonymous identifier and each data receiver's notion of identity for a particular user. In this way, when processing server-to-server request 114 and a user's identity is required, distribution server 118 will resolve or determine the user identity specific to each data receiver from the anonymous identifier and pass each of those user identities to the appropriate data receiver.

For each data receiver web server 112, data distribution server 118 encodes the server-to-server data transaction to an encoded message according to a network protocol suitable for the data receiver. Each data receiver web server 112 receives a separate encoded message from data distribution server 118. Data distribution server 118 appends network protocol metadata to each encoded message in order to represent the received data from user device 104. The network protocol metadata includes one of the third-party end user identities and at least one of a client IP address associated with user device 104, a device type of user device 104, and a synthetic cookie. Data distribution server 118 initiates a network request and sends the encoded message, with the appended network protocol data, to data receiver web servers 112. Communication between data distribution server 118 and data receiver web servers 112 can be made through any type of network or group of networks, including without limitation the Internet, a metropolitan area network, a wide area network, and a local area network. Data can be sent to data receiver web servers 112 by way of an HTTP GET request. A non-limiting example of such an HTTP GET request is shown in FIG. 19. It is to be understood that an HTTP GET request can be structured in other ways and contain other data and still provide substantially the same or similar function as the illustrated example.

As previously mentioned, site privacy policies, business consortium guidelines and government regulations often require disclosure and opt-out for marketing and behavioral data collection. The present invention allows websites to provide consumers with a level of privacy notification and control.

Figure 20:
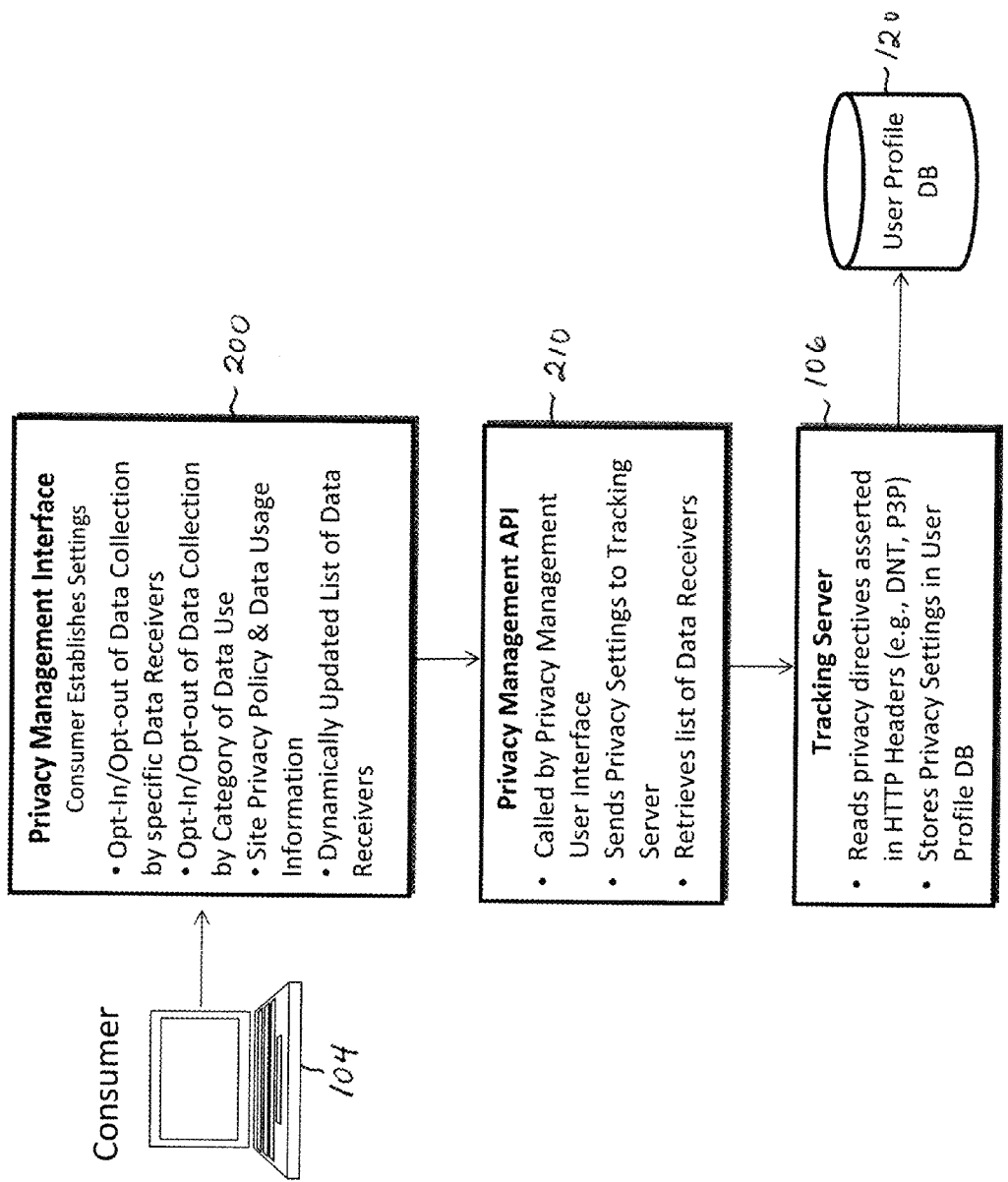
FIG. 20 is a flow diagram showing how users may, through the use of a privacy management interface, create and save privacy settings in a user profile database.
Figure 21:
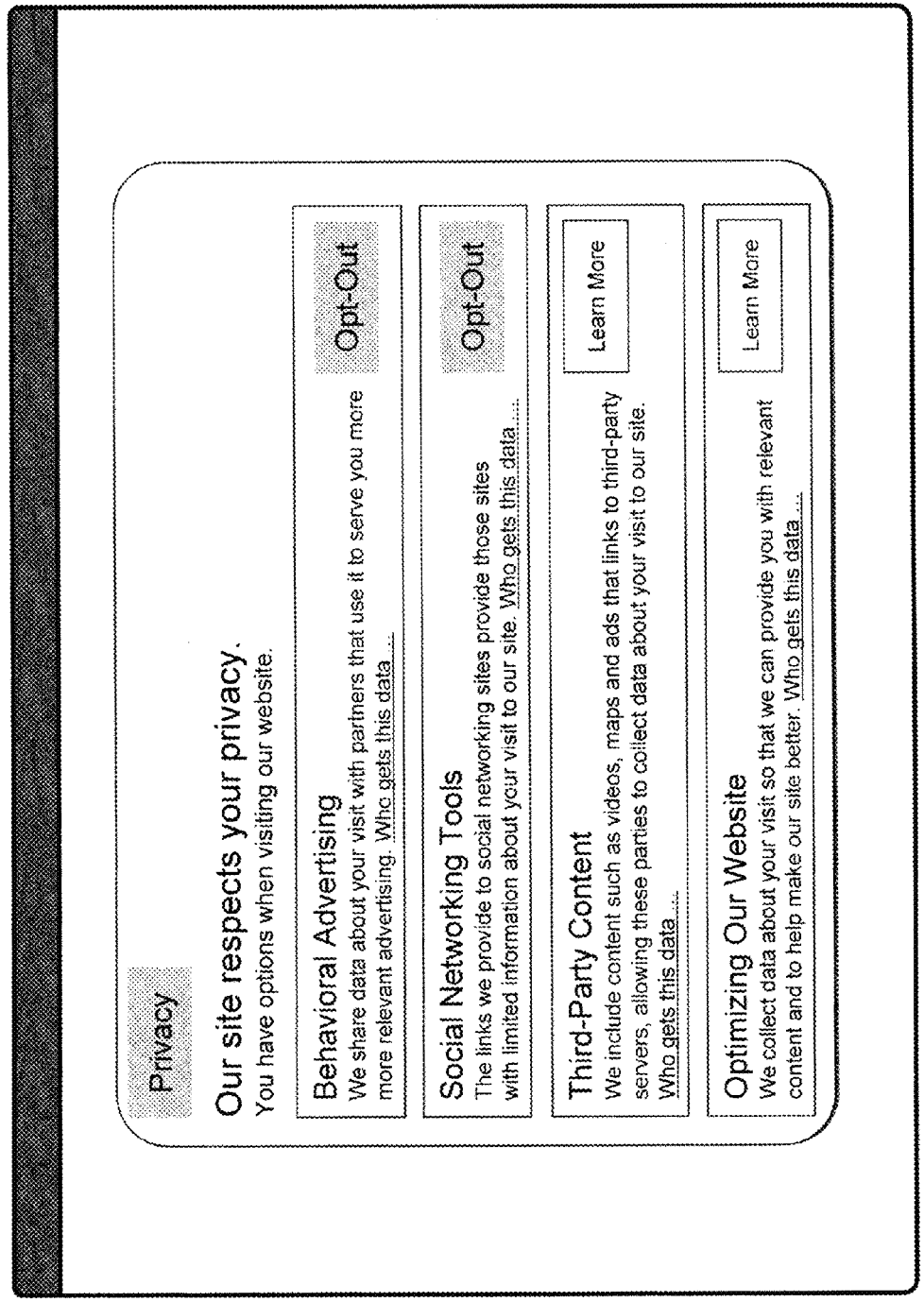
FIG. 21 shows a page in the privacy management interface.

As shown in FIG. 20, user device 104 can access a user interface, referred to Privacy Management Interface 200, that is connected to user profile database 120. FIG. 21 shows one screen of Privacy Management Interface 200 as it would appear on a graphical display, such a computer display screen.

Privacy Management Interface 200 performs at least the following functions: (1) displays a dynamically-updated list of the data receivers that are currently collecting data on various website; (2) allows the user to selectively opt-out and opt-in from certain categories of data collection and data use; and (3) allows the user to selectively opt-out and opt-in to data being passed to certain data receivers.

Examples of categories of data collection and data use include without limitation behavioral advertising, marketing communications, third party websites, and measurement and optimization. In the category of behavioral advertising, data collection uses observed user behavior on one website for the purpose of determining the appropriate advertisements to display to a user on a third-party website. In the category of marketing communications, collected data is used for Email, SMS (short message service) and other forms of one-to-one communications to the consumer. In the category of third-party websites, data collection involves links to third-party websites such as Facebook and Twitter that include content from those websites and in doing so cause the user's behavior on the first-party website to be known to the third-party website. In the category of measurement and optimization, data is collected for the purposes of measuring the effectiveness of the first-party website, the advertisements served on the first-party website, and for customizing the content displayed on the first-party website.

The opt-in/opt-out settings of the user, also referred to as "privacy settings," are stored in user profile database 120. It is to be understood that user profile database 120 is not storage on or in user device 104. Whereas prior art relies on causing an "opt-out cookie" for each individual data receiver to be set and stored on the user's web browser, user profile database 120 allows distribution server 118 to enforce the user's privacy settings for a given website by selectively suppressing or allowing data to be passed to data receiver web servers 112 based on those settings. By allowing privacy settings for the above describe categories, the consumer can selectively allow and prevent certain types of data collection and selectively allow and prevent certain types of data elements to be passed to data receiver web servers 112.

Privacy Management Interface 200 communicates with Privacy Management API 210 made available in the user agent runtime of user device 104. An implementation of this API can be a JavaScript function call for use within the context of a web browser. Examples of such JavaScript function calls include without limitation:

bt_privacy.category("Category",optOut)—opts a user out of a particular category;

bt_privacy.vendor("Quantcast",optOut)—opts a user out of data being sent to a vendor named "Quantcast"; and bt_privacy.getTrackers( )—returns list of data receivers active for the site.

Privacy Management API 200 processes the function call and invokes an HTTP GET request to tracking server 106 that sets the user's privacy settings in user profile database 120 or retrieves the list of data receivers. On subsequent requests from user device 104, tracking server 106 reads the user's privacy settings from user profile database 120 and suppresses data collection for opted-out categories and opted-out data receivers based on those settings. Said suppression is performed when tracking server 106 constructs tag code 108 in response to stub tag request 105 (FIG. 7). Tag code 108 is configured to collect data elements according to one of more data receiver tags for visited webpage 102, where the data elements to be collected excludes at least one data element according to one or more privacy settings of the user of user device 104.

In constructing tag code 108, tracking server 106 accesses data collection settings database 90 to obtain data collection settings. Data collection settings are made by an administrator of the visited website and identify all possible data elements that can be collected from the visited website. Suppression is performed by applying a filter to the data collection settings obtained by tracking server 106 from data collection settings database 90. Applying the filter results in removal of data element collection code, collector tag links and server-to-server tracking transactions related to the opted-out categories and opted-out data receivers. Thus it will be appreciated that a particular privacy setting can specify a data receiver identified by the user as ineligible to receive any of the data elements to be collected by tag code 108. Also, a particular privacy setting can specify a category of data use identified by the user as disqualified.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A network communication method comprising:
   receiving a stub tag request from a user device, the user device having received source code of a visited webpage associated with a website;
   determining, from the received stub tag request, a site configuration that identifies one or more webpages of the website and identifies one or more data receiver tags assigned to each one of the webpages of the website;
   identifying the visited webpage at least in part from one or more parameters from a network request header;
   constructing a response to the stub tag request, the response including at least one of a collector tag, a browser-direct data distribution tag, and a user ID synchronization tag; and
   sending the response to the user device.

2. The method of claim 1, wherein the receiving step, determining step, identifying step, constructing step, and sending step are performed by one or more electronic network servers separate and distinct from the user device and servers hosting the visited webpage.

3. The method of claim 1, wherein the received stub tag request comprises a first call from the user device and a second call from the user device, the first call for retrieving a script code, the second call for retrieving the response including at least one of the collector tag, the browser-direct data distribution tag, and the user ID synchronization tag.

4. The method of claim 1, wherein the stub tag is not a concatenation of multiple tracking tags into a combined code statement.

5. The method of claim 1, wherein the stub tag request includes a site ID of a stub tag within effective source code of the visited webpage, the site ID being an identifier unique to the website.

6. The method of claim 5, wherein the stub tag is contained in effective source code of a plurality of webpages of the website, and the stub tag is substantially identical for each one of the plurality of webpages.

7. The method of claim 5, wherein the determining step includes matching the site ID to the site configuration.

8. The method of claim 7, wherein the determining step includes accessing a data distribution settings database, wherein the site configuration is one of a plurality of site configurations stored in the data distribution settings database.

9. The method of claim 8, wherein the constructing step includes determining whether the response is to include one or more of the collector tag, the browser-direct data distribution tag, and the user ID synchronization tag, and the determining step is performed according to information from the data distribution settings database.

10. The method of claim 1, wherein the constructed response includes the browser-direct data distribution tag, and the browser-direct data distribution tag includes at least one data receiver instruction retrieved from a data receiver settings database, each data receiver instruction including a tag code specified by a data receiver for collecting data elements and including instructions for transforming collected data elements into a format expected by the data receiver.

11. The method of claim 1, wherein the constructed response includes the user ID synchronization tag, and the user ID synchronization tag includes instructions for the user device to signal a data receiver's web server to initiate user ID synchronization.

12. The method of claim 1, wherein the constructed response includes the collector tag and the collector tag includes a data collection code that collects, for a plurality of data receivers, one or more data elements that would be collected by one or more data receiver tags for the visited webpage, the one or more data receiver tags for the visited webpage correspond to one or more data receiver tags assigned to a particular webpage identified in the site configuration, and the particular webpage matches the identity of the visited webpage.

13. The method of claim 12, wherein the constructed response does not include a tag code obtained from any one of the data receivers.

14. The method of claim 12, further comprising receiving data from the user device, the received data having been collected according to the data collection code of the collector tag, wherein the received data is representative of the one or more data elements that would be collected by the one or more data receiver tags for the visited webpage.

15. The method of claim 14, further comprising retrieving at least one data receiver instruction from a data receiver settings database, each data receiver instruction including an API call for contacting a data receiver and including instructions for transforming the received data from the user device into a format expected by the data receiver.

16. The method of claim 15, further comprising constructing a server-to-server data transaction including the API call and the received data having been transformed according to the at least one data receiver instruction.

17. The method of claim 16, wherein the response sent to the user device includes an anonymous identifier that uniquely identifies the user device, and the method further comprises attaching the anonymous identifier to the server-to-server data transaction.

18. The method of claim 17, further comprising enqueueing the server-to-server data transaction, dequeueing the server-to-server data transaction, and matching the anonymous identifier attached to the dequeued server-to-server data transaction with a plurality of third-party end user identities, wherein each third-party end user identity is unique to one of the data receivers.

19. The method of claim 17, further comprising matching the anonymous identifier with a plurality of third-party end user identities, wherein each third-party end user identity is unique to one of the data receivers.

20. The method of claim 19, wherein the matching step includes looking up the least one third-party end user identity in a user profile database.

* * * * *